(12) United States Patent
Shibata et al.

(10) Patent No.: US 7,976,922 B2
(45) Date of Patent: Jul. 12, 2011

(54) OPTICAL RECORDING MEDIUM

(75) Inventors: Kiyoto Shibata, Isehara (JP); Masataka Mohri, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 706 days.

(21) Appl. No.: 12/001,636

(22) Filed: Dec. 12, 2007

(65) Prior Publication Data
US 2008/0138563 A1 Jun. 12, 2008

(30) Foreign Application Priority Data

Dec. 12, 2006 (JP) .................................. 2006-334875
Nov. 2, 2007 (JP) .................................. 2007-286124

(51) Int. Cl.
*B32B 3/02* (2006.01)
(52) U.S. Cl. ..................... 428/64.1; 428/64.4; 430/270.1
(58) Field of Classification Search .................. 428/64.4
See application file for complete search history.

(56) References Cited

U.S. PATENT DOCUMENTS

| | | | |
|---|---|---|---|
| 6,645,596 B1 * | 11/2003 | Murakami et al. | 428/64.1 |
| 2004/0013976 A1 * | 1/2004 | Fujimoto et al. | 430/270.14 |
| 2006/0227695 A1 * | 10/2006 | Nagaoka | 369/275.1 |
| 2006/0264588 A1 * | 11/2006 | Tokuda et al. | 526/209 |
| 2007/0036935 A1 * | 2/2007 | Fujii et al. | 428/64.4 |
| 2007/0259288 A1 * | 11/2007 | Yokoyama | 430/270.11 |

FOREIGN PATENT DOCUMENTS

| | | |
|---|---|---|
| JP | 09-169956 | 6/1997 |
| JP | 10-008018 | 1/1998 |
| JP | 10-120982 | 5/1998 |
| JP | 11-213459 | 8/1999 |
| JP | 2001-049198 | 2/2001 |
| JP | 3241560 | 10/2001 |
| JP | 2003-048375 | 2/2003 |
| JP | 2005-064328 | 3/2005 |
| JP | 2005-108396 | 4/2005 |
| JP | 2005-161831 | 6/2005 |
| JP | 2006-048496 | 2/2006 |
| JP | 2007-226911 | 9/2007 |
| WO | WO 2006/009234 A1 | 1/2006 |

* cited by examiner

*Primary Examiner* — Elizabeth Mulvaney
(74) *Attorney, Agent, or Firm* — Cooper & Dunham LLP

(57) ABSTRACT

An optical recording medium including a substrate, an information recording layer including a recording layer and a cover layer, wherein information is written and read on the information recording layer by irradiation of laser beam via the cover layer, the cover layer includes an ultraviolet curing resin and an inner hardness Hi defined as hardness H of the cover layer on a side of the information recording layer satisfies the following relationship: $3.8 \leq Hi \leq 5.5$, when $H=3.8584 \times F/(h \times h)$, wherein h represents an indented depth in a state in which a triangular pyramid indenter with a tip angle of 115° is pressed under $F=9.8$ mN.

2 Claims, 6 Drawing Sheets

(a)

(b)

(c)

OPTICAL RECORDING MEDIUM

BACKGROUND OF THE INVENTION

1. Field of the Invention

The present invention relates to an optical (information) recording medium.

2. Discussion of the Background

Unexamined published Japanese patent applications Nos. (hereinafter referred to as JOP) 2003-48375, 2005-161831 and 2005-108396 describe teachings about write-once optical recording media in which information can be written and read for a wavelength shorter than blue laser wavelength. In these teachings, especially the utility of a recording layer containing a metal oxide or a half metal oxide, especially bismuth oxide, as a main component, is described. In addition, JOP 2005-064328 describes a write-once optical recording medium which has a recording layer having a bismuth oxide and containing at least one element X selected from B, P, Ga, As, Se, Tc, Pd, Ag, Sb, Te, W, Re, Os, Ir, Pt, Au, Hg, Tl, Po, At and Cd.

On the other hand, as the optical disc system in the blue laser generation, Blu-ray disc format in which an optical system having blue laser of 405 nm and an aperture NA of 0.85 is adopted is proposed and its commercialization has already started. In this format, different from the typical designing, irradiation of writing and reading light is designed to be not from the substrate side but from the side of a cover layer having a thickness of about 0.1 mm to secure the tilt margin in the optical system having a high NA.

However, in the case of a cover layer having a layer thickness of about 0.1 mm, when a disc is molded by the typical injection molding method for polycarbonate, a new problem arises such that sufficient mechanical strength and thickness distribution and uniformity of the optical property in the surface are not secured. Japanese patent No. 3241560 describes a structure in which a cover layer is provided on the opposite side to the typical case relative to a substrate. Namely, a reflective layer, a first dielectric layer, a phase change recording layer, a second dielectric layer and a cover layer are provided on a substrate in this order. Thereby, a phase change recording medium having a thin cover layer is manufactured. In this manufacturing method, a pre-grooved substrate is injection molded using a stamper and then a reflecting layer, a first dielectric layer, a phase change recording layer and a second dielectric layer are formed on the pre-grooved surface. Thereafter, on the surface of the second dielectric layer, a cover layer is formed by spin coating an ultraviolet curing resin or attaching a film sheet. As a method of obtaining a cover layer having a highly uniform layer thickness, JOP H11-213459 describes a method of applying an ultraviolet curing resin by a spin coating method in which the center hole is masked and JOP 2006-48496 describes a spin coat method in which the temperature distribution is imparted in a concentric manner on a substrate and the viscosity of an ultraviolet curing resin is made different along the radius direction.

In the thus made optical recording media, the writing and reading laser is incident from the reverse side of the substrate so that the thickness of the substrate can be sufficiently made to be thick. In addition, since substrates are not required to have particular optical characteristics such as transmittance or double refraction, such substrates can be molded with a focus on transferability of groove, mechanical characteristics of a medium, etc. When this type of optical recording medium is used, it is possible to use a head for an optical recording medium having a high NA while sufficiently securing the mechanical strength of a substrate.

However, when a cover layer is formed using an ultraviolet curing resin, the reliability of an optical information recording medium (optical recording medium) tends to deteriorate. Specifically, in the high temperature (80° C.) and high humidity (85% RH) acceleration test (300 h), the reading jitter (hereinafter referred to as archival jitter) of the initially recorded portion and the writing jitter (hereinafter referred to as shelf jitter) of the portion in which information is written after the test tend to deteriorate.

To the contrary, JOPs 2001-49198, H10-120982, H10-8018 and H09-169956 describe a technology in which a reliable adhesive structure is obtained by using a photo polymerization initiator having a relatively large absorption constant in a long wavelength range longer than about 400 nm to improve internal hardness. However, there is no description in any of the JOPs about application to the cover layer of an optical recording medium in which light is incident via the cover layer as in the present invention. In addition, the technology described in these JOPs is about read only media and thus improvement on archival characteristics and/or shelf characteristics of recordable media is not described. Also, there is no indication or description about a preferred range of the inner hardness.

SUMMARY OF THE INVENTION

Because of these reasons, the present inventors recognize that a need exists for an optical recording medium which is free from deterioration of writing and reading characteristics after preservation over an extended period of time.

Accordingly, an object of the present invention is to provide an optical recording medium which is free from deterioration of writing and reading characteristics after preservation over an extended period of time.

Briefly this object and other objects of the present invention as hereinafter described will become more readily apparent and can be attained, either individually or in combination thereof, by an optical recording medium including a substrate, an information recording layer including a recording layer and a cover layer wherein information is written and read on the information recording layer by irradiation of laser beam via the cover layer, the cover layer including an ultraviolet curing resin and an inner hardness Hi defined as hardness H of the cover layer on the side of the information recording layer satisfies the following relationship: $3.8 \leq Hi \leq 5.5$, when $H=3.8584 \times F/(h \times h)$, wherein h represents an indented depth in a state in which a triangular pyramid indenter with a tip angle of 115° is pressed under $F=9.8$ mN.

It is preferred that, in the optical recording medium, the optical curing resin includes 2-methyl-1-[4-(methylthio)phenyl]-2-morpholinopropane-1-one as an optical polymerization initiator.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 8 is a diagram illustrating typical surface deficiency of a cover layer: FIG. 9 is a diagram illustrating a surface deficient image of a cover layer having a surface deficiency reduced to a level to which servo is not affected.

DETAILED DESCRIPTION OF THE INVENTION

Figure 1:
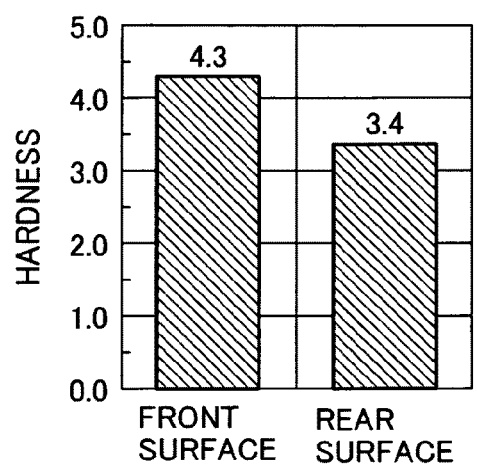
FIG. 1 is a diagram illustrating an example of the difference between the top and the bottom of a cover layer.

The present invention will be described below in detail with reference to several embodiments and accompanying drawings.

The present invention provides a medium including a substrate on which at least an information recording layer including a recording layer and a cover layer are provided and in which information is written and/or read on the information recording layer via the cover layer by irradiation of a laser beam. The cover layer is formed by a spin coat method including a process of providing an optical curing resin to a substrate, a process of extending the optical curing resin by centrifugal force, and a process of curing the optical curing resin by irradiation of light.

As a result of the intensive study on improvement of the archival characteristics and the shelf characteristics of an optical information recording medium, the present inventors have found that the internal hardness Hi of the cover layer is important, which is described later, and thus made the present invention. The internal hardness Hi represents a hardness value measured for a cover layer peeled at the interface with an information recording layer including a recording layer and fixed on a flat substrate such as a glass substrate by an adhesive agent, etc., with the detached face up. When a cover layer is not detached well at the interface, the hardness measured by the following method can be used as a substitute: embed part of a medium containing the cover layer in a two-liquid curing type resin; abrade the medium in the direction perpendicular to the cover layer to obtain a sample with the cross section of the cover layer exposed; and measure the hardness of a portion 10 μm distant from the information recording layer.

The inner hardness Hi of a cover layer can be measured by an Ultra Micro Hardness Tester DUH-211 (manufactured by Shimadzu Corporation), etc. In this method, an indenter is pressed in while increasing a load at a regular pace until the load becomes F. The hardness is obtained by the following relationship: Hardness $H=a \times F/(h \times h)$. In the relationship, h represents the depth of press-in when the load is F and a denotes a constant depending on the form of an indenter. In the case of a tip angle of 115° C. of a triangular pyramid indenter, $a=3.8584$. When the pressing-in force F is 9.8 mN, the depth of the pressing-in to a cover layer is from 2 to 4 μm, which is sufficiently shallow in comparison with a cover layer having a thickness of from about 75 to about 100 μm. Thus, it is possible to evaluate the hardness property near the interface with an information recording layer without considering the influence of physical property of the glass, etc. as a substrate under the cover layer and an adhesive layer (it is generally said that when a material is about 10 times as thick as the depth of press-in, the influence under the material can be ignored). A press-in force that is excessively small is not preferred because the influence by system drift, vibration due to the environment and the method of fixing a sample increases. When the press-in force is too large, the influence in the depth direction is not ignorable as described above.

In an embodiment of the present invention, an inner hardness Hi defined as hardness H of the cover layer on the side of the information recording layer satisfies the following relationship: $3.8 \leq Hi \leq 5.5$, when $H=3.8584 \times F/(h \times h)$, wherein h represents an indented depth in the state in which a triangular pyramid indenter with a tip angle of 115° is pressed under $F=9.8$ mN.

When Hi is not less than 3.8, the archival jitter of an obtained medium does not deteriorate. When Hi is too large, the shelf jitter tends to deteriorate. Therefore, it is possible to obtain a reliable medium having a good combination of the archival jitter and the shelf jitter when the relationship mentioned above is satisfied.

To obtain an inner hardness Hi of the side of a cover layer contacting the information layer in the range of from 3.8 to 5.5, the kind and composition ratio of an oligomer, a monomer (reactive diluting agent), and a photopolymerization initiator are suitably adjusted. In general, when the composition ratio of a monomer increases, the cross-linking density increases and accordingly the hardness becomes high. Also, the curing conditions (intensity of ultraviolet, illuminance, wavelength, etc.) can be suitably adjusted.

The information recording layer of the present invention represents a laminate portion of each layer other than the substrate and the cover layer. For example, in FIG. 6 described later, these are a reflective layer, a first dielectric layer, a recording layer and a second dielectric layer. In addition, a multi-layered optical information recording medium having two or more such information recording layers with (an) intermediate layers therebetween are also within the scope of the present invention.

The relationship between the inner hardness Hi of a cover layer and the reliability of an optical recording medium are considered as follows:

The present inventors have found that the hardness of a cover layer formed of an ultraviolet curing resin having a thickness about 100 μm is different between the top and the bottom thereof. The top and the bottom of a cover layer represents the side on which ultraviolet is incident when an ultraviolet curing resin is cured, i.e., the surface of a cover layer on which writing and reading beam is incident, and the side sharing the border with an information recording layer, respectively.

In general, the hardness represents elasto-plastic distortion resistance for press-in by an indenter. In the case of an ultraviolet curing resin, the hardness can be taken as a characteristic value reflecting the curing characteristics such as cross-linking and elasticity of a cured material. Namely, a material having a large hardness value tends to have a large elasticity and cross-linking density and a high glass transition temperature. To the contrary, a material having a small hardness value tends to have a small elasticity and cross-linking density and a low glass transition temperature, meaning a low heat resistance.

Figure 2:
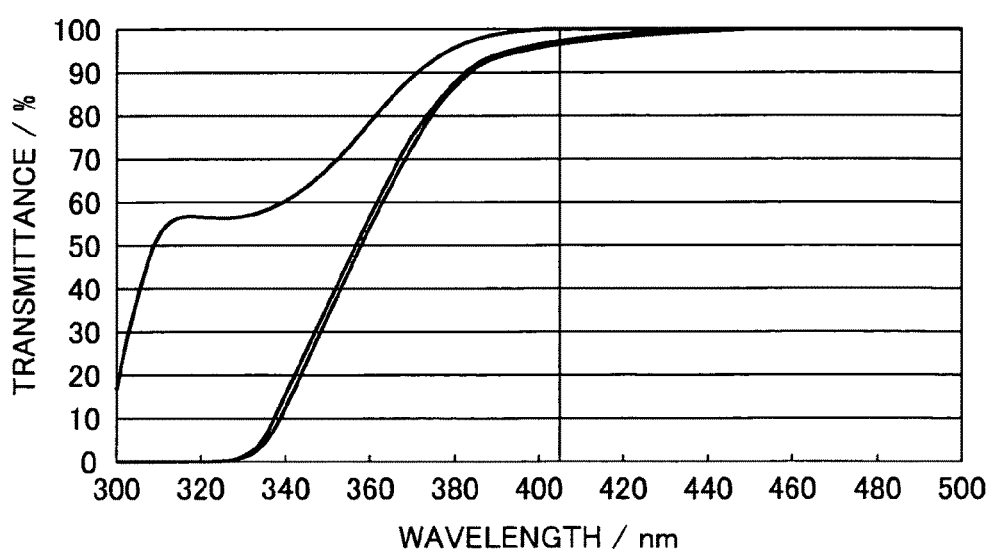
FIG. 2 is a diagram illustrating a transmittance spectrum of a typical ultraviolet curing resin cured material.

Considering that there is a hardness difference between the top and the bottom of a cover layer in the hardness measured by micro load, which is the target of the present invention, it indicates that the curing property varies in the depth direction of the cover layer. With regard to the hardness difference between the top and the bottom of a cover layer, the hardness on the bottom side tends to be relatively low in comparison with that on the top side except when the top side is insufficiently cured due to the oxygen inhibition during curing. FIG. 1 represents a diagram illustrating a measuring example of an ultraviolet curing resin (RQ6107, manufactured by Mitsubishi Rayon Co., Ltd.) based on Table A. The reason why the hardness on the bottom side of a cover layer is lower than that on the top side is as follows: as seen in FIG. 2 illustrating the transmission spectrum of a typical ultraviolet curing resin cured material formed of urethane(meth)acrylate compound, the ultraviolet curing resin absorbs light having a wavelength not greater than 400 nm; thus; the intensity of ultraviolet is weak inside the film so that the radical generation reaction of a photopolymerization initiator is inhibited; as a result, the cross-linking density on the bottom side decreases. The variance of the curing property in the depth direction as described above is considered to depend on the kind (spectroscopic characteristics), the intensity and illuminance (integration intensity) of a selected light source, and the kind and the density of a polymerizable oligomer and/or monomer serving as compositions of an ultraviolet curing resin and a photopolymerization initiator.

TABLE A

| Cover resin | | RQ6107 |
| --- | --- | --- |
| Test surface | Top surface | Bottom surface |
| Test force/mN | 9.8 | 9.8 |
| Hardness First | 4.251 | 3.340 |
| Second | 4.376 | 3.375 |
| Third | 4.274 | 3.393 |
| Fourth | 4.296 | 3.386 |
| Fifth | 4.327 | 3.345 |
| Average | 4.3 | 3.4 |

According to the inventive study by the present inventors based on the knowledge described above that it is not the curing property of the surface of a cover layer or the curing property in terms of a layer as bulk but the curing characteristic of a cover layer adjacent to the information recording layer that is related to the reliability of a medium, the present invention was thus made. That is, the curing characteristic of a cover layer adjacent to the information recording layer is substitutionally evaluated by hardness and the relationship between the inner hardness Hi and archival jitter and shelf jitter is found.

Figure 3:
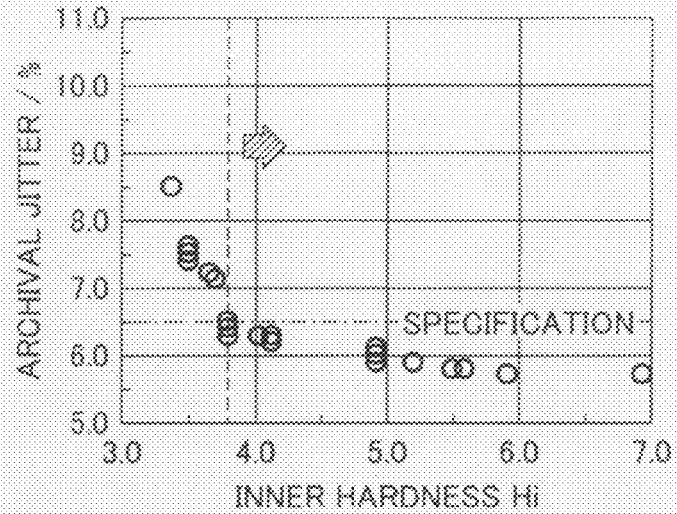
FIG. 3 is a diagram illustrating the relationship between the inner hardness Hi of a cover layer and the archival jitter.
Figure 4A:
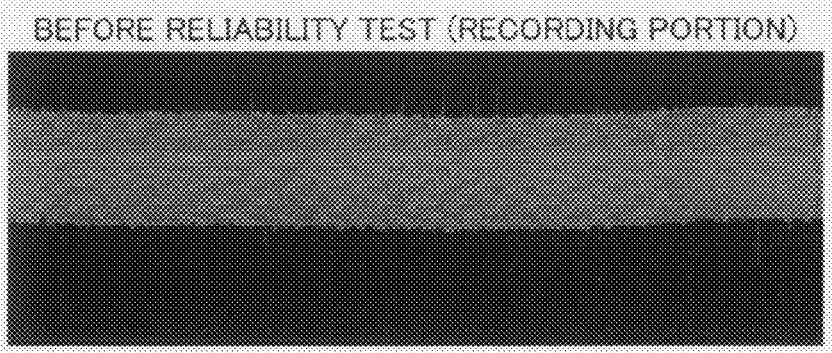
FIG. 4 is a diagram illustrating an example of a signal waveform for a recording portion having deficiency before (FIG. 4A) and after (FIG. 4B) a reliability test.
Figure 4B:
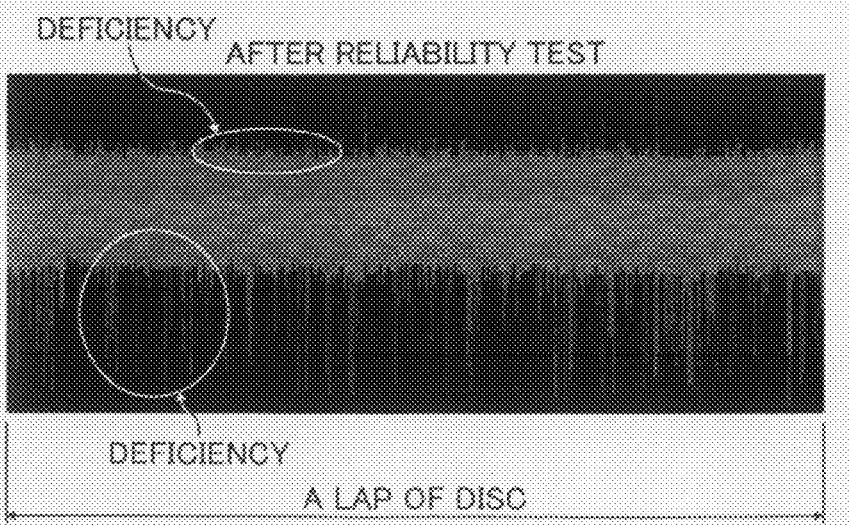
Figure 5:
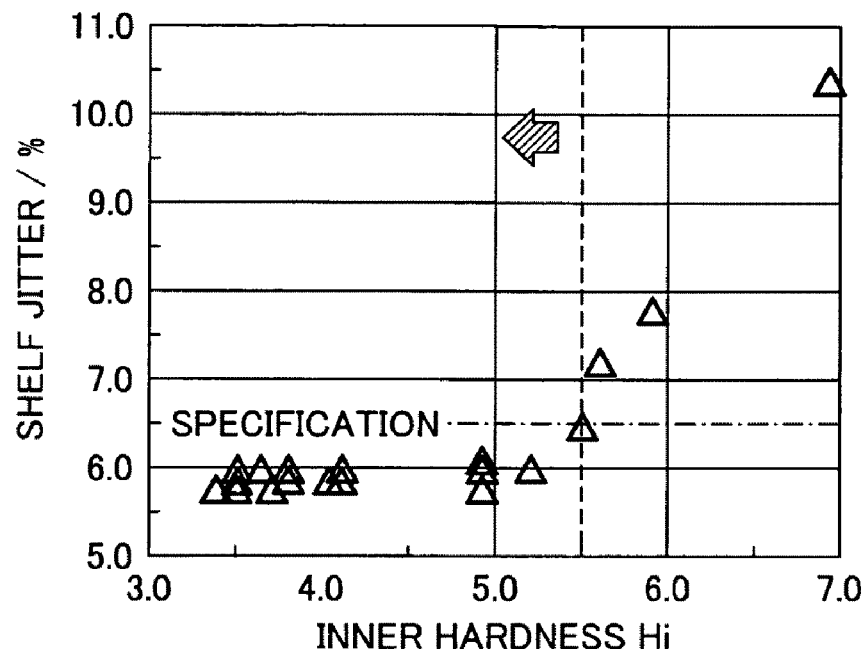
FIG. 5 is a diagram illustrating the relationship between the inner hardness Hi of a cover layer and the shelf jitter.

FIGS. 3 and 5 illustrate the relationship between the inner hardness Hi and archival jitter and shelf jitter of the cover layer of a write once optical recording medium manufactured in the same manner as in Examples described later. FIG. 4 is a diagram relating to the reliability of a write once optical recording medium having an inner hardness Hi of 3.5.

As seen in FIG. 3, when the inner hardness Hi is not less than 3.8, the archival jitter can be reduced within not greater than 6.5%, which is the target of Blu-ray disc format, at the reliance test in the environment of 80° C. and 85% RH for 300 hours. When the inner hardness Hi is less than 3.8, the cross-linking density of the resin inside a cover layer is low and the molecular chain is scarce so that the moisture tends to percolate, resulting in insufficient barrier property to moisture. Due to this, the moisture that has percolated the cover layer is considered to soak the recording layer and the reflective layer. Such a medium has deficiencies of a spike state in the recording signal amplitude as illustrated in, for example, FIG. 4, and thus, the reading jitter and the error ratio increase.

As illustrated in FIG. 5, when the inner hardness Hi is greater than 5.5, the shelf jitter deteriorates. This is considered to be because the inner hardness of a cover layer is high so that the adhesiveness force is insufficient. The thermal stress arises at the interface between the cover layer and the information recording layer during writing. When the adhesiveness of the cover layer is insufficient, detachment occurs at a micro level so that the thermal conductivity to the cover layer changes and the signal length fluctuates. This leads to deterioration of the jitter. For example, in the case of a long mark to which writing energy is concentrated, cross-writing to adjacent tracks easily occurs. In addition, the space signal followed by the long mark is also easily affected.

Essentially, optical writing in an optical recording medium is thermal recording using light. It is well known that, when the thermal characteristics such as the heat capacity and thermal conductivity of dielectric layers (protective layers) sandwiching a recording layer change, the heating temperature and the cooling speed at a mark portion vary and furthermore, the heat interference between marks in the writing direction or adjacent tracks varies, which affects the form of writing mark and the writing jitter. It is inferred that a similar change to this occurs due to the insufficient adhesiveness between the information recording layer and the cover layer.

As seen in the results described above, when the inner hardness Hi is from 3.8 to 5.5, it is found that a reliable medium having a good combination of the archival jitter and the shelf jitter can be obtained.

A preferred specific embodiment of the present invention includes an optical information recording medium in which the cover layer is formed of at least a radical polymerizable oligomer such as urethane(meth)acrylate, epoxy(meth)acrylate and/or polyester(meth)acrylate, a reactive dilute agent formed of a (meth)acrylate monomer, and a photopolymerization initiator formed of 1-hydroxy-cyclohexyl-phenyl-ketone and/or 2-hydroxy-1-{4-[4-(2-hydroxy-2-methyl-propyonyl)-benzil]phenyl}-2-methyl-propane-4-one and 2-methyl-1-[4(methylthio)phenyl]-2-morpholinopropane-1-one.

By using 1-hydroxy-cyclohexyl-phenyl-ketone and/or 2-hydroxy-1-{4-[4-(2-hydroxy-2-methyl-propyonyl)-benzil]phenyl}-2-methyl-propane-4-one as a photopolymerization initiator, a cured layer can be obtained in which yellowing (a phenomenon in which a cured material looks discolored to yellow due to formation of a material having a light absorption in the blue color wavelength range around 400 nm) hardly occurs over time. When yellowing occurs to a cured layer, the transmission ratio at 405 nm thereof varies and thus the writing and reading characteristics of a medium change, which is not preferred.

Furthermore, by adding 2-methyl-1-[4(methylthio)phenyl]-2-morpholinopropane-1-one to the polymerization initiator mentioned above, the surface curing property is improved so that a flat cover layer having no surface deficiency can be obtained.

Figure 8A:
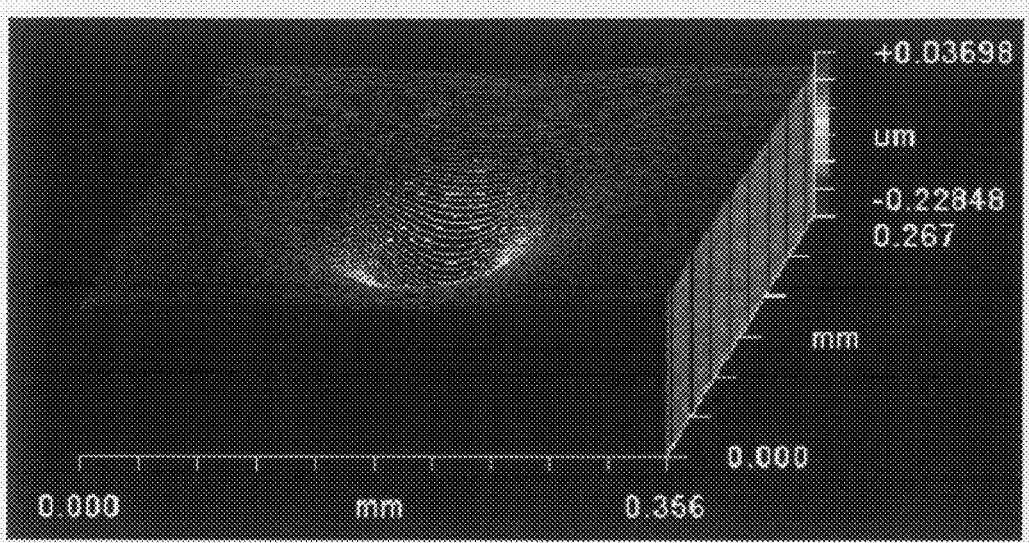
FIG. 8A illustrates the surface form and FIG. 8B illustrates the line profile thereof.
Figure 8B:
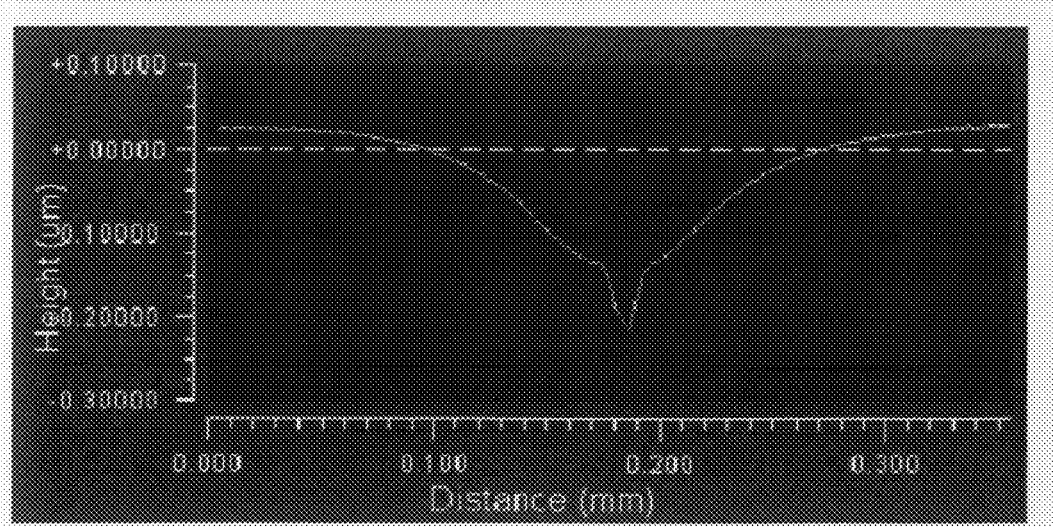

FIG. 8 is a diagram illustrating a typical surface deficiency image of a cover layer measured by using an interference type surface form measuring device (New View 6000, manufactured by Zygo Corporation). FIG. 8A is a diagram illustrating the surface form and FIG. 8B is a diagram illustrating a line profile thereof. When the surface curing property of an optical curing resin is insufficient, or when the intensity of ultraviolet irradiation is low, the surface deficiency as illustrated in FIG. 8 occurs in several hundreds to thousands portions in the disc phase. Such deficiency does not cause a problem when the writing speed is slow. However, when the recording linear velocity reaches, for example, 4 to 8×, the servo error results in tracking error and increase in the deficiency ratio.

Such surface deficiency is thought to be formed in the following way: Gas composition merged in an optical curing resin agglomerates and thus produced foams break during curing. Generally, radicals produced in an optical curing resin by irradiation of ultraviolet disappear in the reaction with oxygen in a layer surface atmosphere. Therefore, the curing reaction at the layer surface tends to be relatively slow in comparison with that in the inside (i.e., oxygen inhibition in photopolymerization reaction). The surface deficiency as illustrated in FIG. 8 tends, to appear due to such oxygen inhibition or when the intensity of the ultraviolet irradiation is insufficient so that the curing reaction at the surface is slow.

Figure 9A:
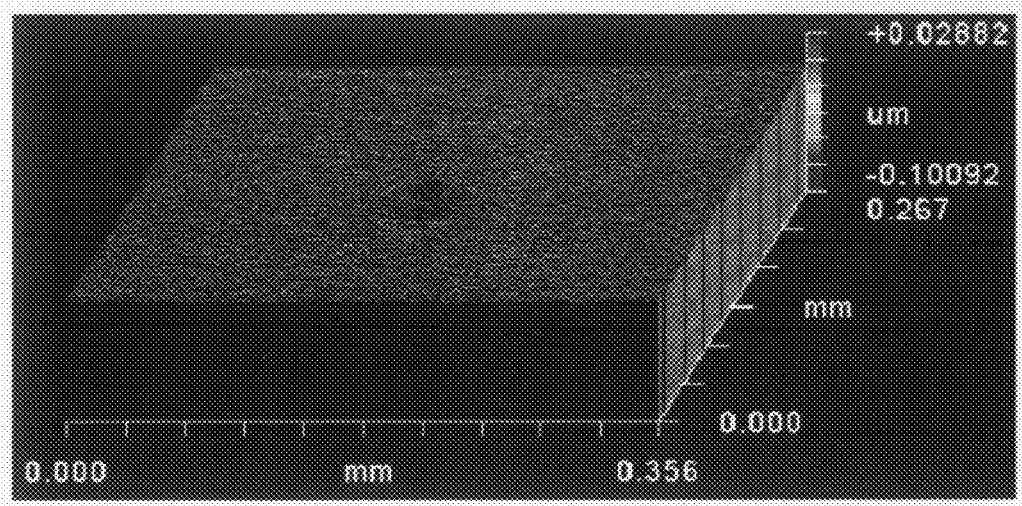
FIG. 9A illustrates the surface form and FIG. 9B illustrates the line profile thereof.
Figure 9B:
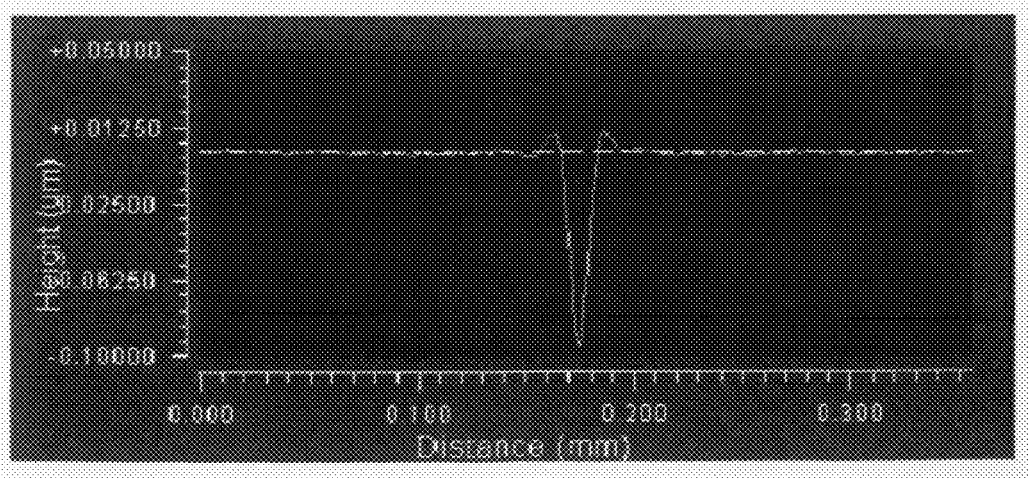

2-methyl-1-[4(methylthio)phenyl]-2-morpholinopropane-1-one, which is excellent in the surface curing property, is added to promote the curing reaction at the surface. Thus, the surface deficiency as illustrated in FIG. 8 can be decreased. Furthermore, as seen in FIG. 9, the deficiency size can be reduced to the level to which there is no influence to servo tracking. The diagram illustrated in FIG. 9 is a surface deficiency image measured in the same manner as in FIG. 8. FIG. 9A is a diagram illustrating the surface form and FIG. 9B is a diagram illustrating the line profile thereof.

As a more preferred embodiment of the present invention, a write once optical recording medium including a recording layer containing a bismuth oxide and at least one element X selected from B, Ga, Pd, Ag, Sb, Te, W, Pt, Au, Al, Cr, Mn, In, Co, Fe, Cu, Ni, Zn, Li, Si, Ge, Zr, Ti, Hf, Sn, Mo, V and Nb can be used. That is, to improve writing and reading characteristics and preservation stability, it is characteristic to add at least one element X other than bismuth to a recording layer containing a bismuth oxide. It is typically preferred that a bismuth oxide occupies about 50 to about 95 mol % based on the total amount of the materials for use in a recording layer. It is not necessary to completely oxidize bismuth or the other element and it is allowed to form a recording layer in a state of oxygen deficiency in terms of chemical amount composition. The chemical amount composition represents the composition of a compound stably existent at room temperature under a normal pressure. For example, oxides such as $Bi_2O_3$, $B_2O_3$, $Al_2O_3$, $TiO_2$ and $In_2O_3$ are chemical amount composition. The state in which oxygen is deficient in terms of chemical amount composition means, for example, $BiO_{1.48}$ in the form of $BiO_x$, when x is less than 1.5 in the case of Bi. In the case in which there is no oxygen deficiency in terms of chemical amount composition, it is $BiO_{1.5}$.

When a recording layer is only formed of a bismuth oxide, deterioration by writing light significantly occurs, or the archival jitter indicating the preservation reliability increases. Thus, such a recording layer is not practical. When at least one element X mentioned above is added, it is possible to improve the thermal conductivity, absorption characteristics and writing sensitivity of a recording layer, and the stability of writing marks against reading light and temperature.

For example, with regard to the writing sensitivity, when at least one element mentioned above is Ge, Sn, Li, etc., which has the same oxide production enthalpy as Bi, the oxides thereof can be easily present as the element by releasing oxygen after layer formation sputtering. Thus, the absorption ratio of light and the sensitivity improve. Elements such as Li, Na, Mg, K, Ca and P have a characteristic such that these elements tend to be glassified in coexistence of a bismuth oxide. This mechanism has not been clarified but there is a possibility that semi-stable state, i.e., glass state, has something to do with improvement on the sensitivity. In addition, elements which are relatively difficult to be oxidized, for example, Cu, Ag and Pd, are existent themselves and the sensitivity is improved. The elements in the La group are easily oxidized in comparison with Bi so that Bi is existent as a separate metal, which is thought to contribute to sensitivity improvement.

As another preferred embodiment of the present invention, an optical information recording medium having a recording layer formed of Bi, B, Ge and O can be used. The recording layer to which Ge is added increasingly absorbs light and the sensitivity improves. Especially, such an optical recording medium has good property for high linear velocity writing. The mechanism has not been clarified yet but it is inferred that oxidization of Bi is restrained, Bi metal easily precipitates, light absorption increases and thus the sensitivity is improved. In addition, in the medium in which Ge is added, the writing power margin is wide in addition to the improvement on the sensitivity so that stable writing and reading are possible. The content of Ge is preferably as follows: $0.01 \leq Ge/(Bi+B+Ge) \leq 0.1$. When $Ge/(Bi+B+Ge)$ is too small, the addition effect of Ge is not obtained. To the contrary, when $Ge/(Bi+B+Ge)$ is too large, the writing jitter increases, which is not preferred.

Figure 6:
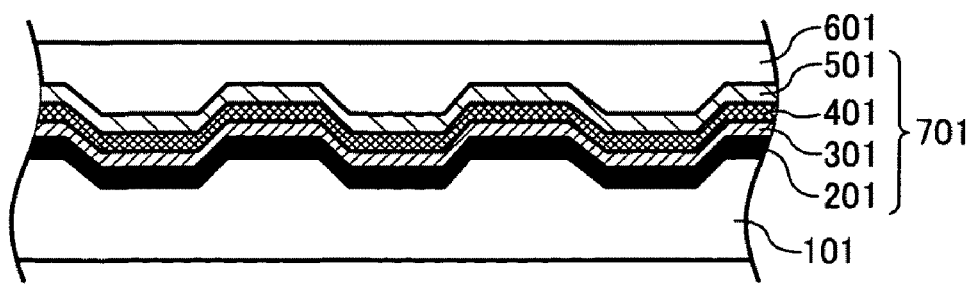
FIG. 6 is a diagram illustrating a structure example of the optical information recording medium of the present invention.

FIG. 6 is a diagram illustrating an embodiment of the structure of the optical information recording medium of the present invention. The phase from which light for writing and reading information is incident is the upside in FIG. 6.

A substrate 101 is manufactured by injection-molding a resin such as polycarbonate, acryl and polyolefin and has a spiral groove on the side on which an information recording layer 701 is provided. In the medium of FIG. 6, the laser beam for writing and reading is incident from the side of a cover layer 601. Therefore, the substrate material is not necessarily transmissive. Mold materials having good transferability of the groove and good mechanical characteristics against warp, etc. can be selected. In general, inexpensive polycarbonate resins, which are already widely accepted in the CD or DVD market, are selected.

The information recording layer 701 is a phase change information recording layer containing a phase change recording material or a write once information recording layer containing a pigment material or an inorganic material. When the information recording layer is a phase change information recording layer or a write once information recording layer containing an inorganic material, the information recording layer is manufactured by forming a reflective layer 201, a first dielectric layer 301, a recording layer 401 and a second dielectric layer 501 on the substrate 101 in this order by a known sputtering method, etc.

As the material for the reflective layer 201, a material that has a high reflectivity for a wavelength for use in reading light is used. Specific examples thereof include metals such as Au, Al, Ag, Cu, Ti, Cr, Ni, Pt, Ta and Pd and alloys thereof. Among these, Au, Al and Ag are suitable as a material for a reflective layer since Au, Al and Ag have a high reflectivity and a good thermal conductivity. In addition, other elements can be added in a minor amount in combination with the metals mentioned above. Specific examples of such elements include metals or half metals such as Mg, Se, Hf, V, Nb, Ru, W, Mn, Re, Fe, Co, Rh, Ir, Zn, Cd, Ga, In, Si, Ge, Te, Pb, Po, Sn and Bi. It is also possible to use a layer as a reflective layer in which multiple layers are formed by alternately accumulating a low refractive layer and a high refractive layer formed of a non-metal material.

The reflective layer 201 preferably has a thickness of from 20 to 300 nm.

The first dielectric layer 301 and the second dielectric layer 501 can be formed by a material having a high melting point with a high transparency such as oxides, sulfides, nitrides and carbides of metals and semi-conductors. Specific examples thereof include oxides such as $SiO_x$, ZnO, $SnO_2$, $Al_2O_3$, $TiO_2$, $In_2O_3$, MgO, $ZrO_2$, and $Ta_2O_5$, nitrides such as $Si_3N_4$, AlN, TiN, BN and ZrN, sulfides such as ZnS and $TaS_4$ and carbides such as SiC, Tac, $B_4C$, WC, TiC and ZrC. These can be used alone or in combination and also a multiple layer structure can be taken.

Materials suitable for the dielectric layers 301 and 501 are determined in consideration of refractivity, thermal conductivity, chemical stability, mechanical strength, adhesiveness, etc. A mixture layer of $SiO_2$ containing ZnS in an amount of 60 to 90 mol % is especially preferred since crystallization of the layer, chemical reaction with an information recording layer, layer transformation do not occur at a high temperature. In addition, since the thermal conductivity thereof is low, i.e., not greater than 0.5 W/mK, it is possible to keep the heating temperature high at the recording portion, which is advantageous in formation of marks having a high modulation. Therefore, the mixture layer is suitable as the dielectric layers 301 and 501 adjacent to the recording layer 401.

The first dielectric layer 301 has functions of preventing the reaction between the recording layer 401 and the reflective layer 201 and suitably controlling the thermal conduction to the reflective layer 201. Preferred layer thickness of the first dielectric layer 301 is from 5 to 30 nm.

The second dielectric layer 501 has functions of preventing moisture and oxygen from penetrating from the cover layer side and restraining excessive heat distortion of the cover layer 601. Preferred layer thickness of the second dielectric layer 501 is from 5 to 100 nm.

As described above, the material containing a bismuth oxide and at least one element X is preferably used for the recording layer 401. A material mainly containing Bi, B and O and a material mainly containing Bi, B, O and Ge are more preferably used. The recording layer 401 having such materials is manufactured by, for example, a co-sputtering method in which $BiO_3$ target and $B_2O_3$ target and optionally $GeO_2$ target are used, or a sputtering method in which a target formed by molding $BiO_3$ and $B_2O_3$ target and optional $GeO_2$ is used.

To adjust the content of B in atom ratio to satisfy the following relationship: $0.1 \leq B/(Bi+B) \leq 0.5$, the applied voltage is adjusted for each target in the case of the co-sputtering method. When the molded target is used, the target composition is determined in consideration of the composition difference between the target and the layer.

To form an oxygen deficient state of B and/or Bi relative to the chemical amount composition, it is possible to sinter a target in reduction atmosphere, adjust the layer formation condition such as layer formation ratio and sputtering pressure using a target having a chemical amount composition, or conducting a reactive sputtering by adding a reduction gas such as hydrogen to a sputtering atmosphere.

Preferred layer thickness of the recording layer 401 is from 5 to 30 nm.

As optical curing resins for use in the cover layer 601, there can be used ultraviolet curing resins containing at least a radical polymerizable oligomer formed of urethane(meth)acrylate, epoxy(meth)acrylate and/or polyester(meth)acrylate, a reactive dilute agent formed of a (meth)acrylate monomer, and a photopolymerization initiator formed of 1-hydroxy-cyclohexyl-phenyl-ketone and/or 2-hydroxy-1-{4-[4-(2-hydroxy-2-methyl-propyonyl)-benzil]phenyl}-2-methyl-propane-1-one and 2-methyl-1-[4-(methylthio)phenyl]-2-morpholinopropane-1-one.

Specific examples of urethane(meth)acrylate include compounds obtained by reacting a polyol compound, a polyisocyanate compound and a (meth)acrylate compound containing a hydroxyl group. Specific examples of the polyol compound include a polyether polyol, a polyester polyol, a polycarbonate polyol, a polycaprolactone polyol, an aliphatic hydrocarbon having at least two hydroxyl groups, an alicyclic hydrocarbon having at least two hydroxyl groups, and an unsaturated hydrocarbon having at least two hydroxyl groups. These polyols can be used alone or in combination.

Specific examples of the polyether polyols include aliphatic polyether polyols, alicyclic polyether polyols, and aromatic polyether polyols. Specific examples of the aliphatic polyether polyols include a polyethylene glycol, polypropylene glycol, polytetramethylene glycol, polehexamethylene glycol, polyheptamethylene glycol, polydecamethylene glycol, pentaerythritol, dipentaerythritol, and trimethylol propane; adducts of polyols with alkylene oxide such as an adduct of trimethylol propane triol with ethylene oxide, an adduct of trimethylol propane triol with propylene oxide, an adduct of trimethylol propane triol with ethylene oxide and propylene oxide, and an adduct of pentaerythritol tetraol with ethylene oxide; and polyether polyols which can be obtained by ring opening polymerization of at least two kinds of ion polymerizable cyclic compounds.

Specific examples of the polyether polyols include an adduct of hydrogenated bisphenol A diol with alkylene oxide, an adduct of hydrogenated bisphenol F diol with alkylene oxide, and an adduct of 1,4-cyclohexane diol with alkylene oxide. Specific examples of the aromatic polyether polyols include an adduct of bisphenol A diol with alkylene oxide, an adduct of bisphenol F diol with alkylene oxide, hydroquinone diol with alkylene oxide, an adduct of naphthohydroquinone diol with alkylene oxide and an adduct of anthrahydroquinone diol with alkylene oxide.

Specific examples of the market products of the polyether polyols include PTMG 650, PTMG 1000 and PTMG 2000 (manufactured by Mitsubishi Chemical Corporation); PPG 1000, EXCENOL 1020, EXCENOL 2020, EXCENOL 3020 and EXCENEOL 4020 (manufactured by Asahi Glass Co., Ltd.); PEG 1000, UNISAFE DC1100, UNISAFE DC1800, UNISAFE DCB1100 and UNISAFE DCB1800 (manufacture by NOF Corporation); PPTG 1000, PPTG 2000, PPTG 4000, PTG 400, PTG 650, PTG 2000, PTG 3000, PTGL 1000 and PTGL 2000 (manufactured by Hodogaya Chemical Co., Ltd.); Z-3001-4, Z-3001-5, PBG 2000 and PBG 200B (Daiichi Kogyo Seiyaku Co., Ltd.) TMP 30, PNT4 glycol, EDA P4 and EDA P8 (manufactured by Nippon Nyukazai Co., Ltd.); and QUADROL (manufactured by Adeka Corporation) as aliphatic polyether polyols. Specific examples of the aromatic polyether polyols include UNIOL DA400, UNIOL DA700, UNIOL DA100 and UNIOL DB400 (manufactured by NOF Corporation).

The polyester polyols can be obtained by conducting a reaction between a polyol and a polybasic acid. Specific examples of the polyols include ethylene glycol, polyethylene glycol, propylene glycol, polypropylene glycol, tetramethylene glycol, polytetramethylene glycol, 1,4-butane diol, 1,5-pentane diol, 1,6-hexane diol, 1,7-heptane diol, 1,8-octane diol, neopentyl glycol, 1,4-cyclohexane diol, 1,4-cyclohexane dimethanol, 1,2-bis(hydroxyethyl)cyclohexane, 2,2-diethyl-1,3-propane diol, 3-methyl-1,5-pentane diol, 1,9-nonane diol, 2-methyl-1,8-octane diol, glycerin, trimethylol propane, an adduct of trimethylol propane with ethylene oxide, an adduct of trimethylol propane with propylene oxide, an adduct of trimethylol propane with ethylene oxide and propylene oxide sorbitol, pentaerythritol, pentaerythritol and an adduct of polyol with alkylene oxide. Specific examples of polybasic acid include phthalic acid, isophthalic acid, terephthalic acid, maleic acid, fumaric acid, adipic acid and sebacic acid.

Specific examples of the marketed products of these include KURAPOL P1010, KURAPOL P2010, KURAPOL PMIPA, KURAPOL PKA-A, KURAPOL PKA-A2, and KURAPOL PNA-2000 (manufactured by Kuraray Co., Ltd.).

Specific examples of the polycarbonate polyols include the polycarbonate diol represented by Chemical structure 1:

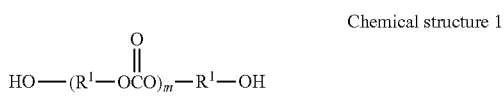

Chemical structure 1

In Chemical structure 1, $R_1$ represent an alkylene group having 2 to 20 carbon atoms, a (poly)ethylene glycol residual group, a (poly)propylene glycol residual group, or a (poly)tetramethylene glycol residual group and m represents an integer of from 1 to 30.

Specific examples of $R_1$ include residual groups in which hydroxyl groups are removed from the following compound at its both ends: 1,4-butan diol, 1,5-pentane diol, neopenthyl glycol, 1,6-hexane diol, 1,4-cyclohexane dimethanol, 1,7-heptane diol, 1,8-octane diol, 1,9-nonane diol, ethylene glycol, diethylene glycol, triethylene glycol, tetraethylene glycol, propylene glycol, dipropylene glycol, tripropylene glycol or tetrapropylene glycol.

Specific marketed products of the polycarbonates include: DN-980, DN-981, DN-982 and DN-983 (manufactured by Nippon Polyurethane Industry Co., Ltd.); PNOC 1000, PNOC 2000, PMC 100 and PMC 2000 (manufactured by Kuraray Co., Ltd.); and PLACCEL CD-205, PLACCEL CD-208, PLACCEL CD-210, PLACCEL CD-220, PLACCEL CD-205PL, PLACCEL CD-208PL, PLACCEL CD-210PL, PLACCEL CD-220PL, PLACCEL CD-205HL, PLACCEL CD-208CL, PLACCEL CD-210HL, PLACCEL CD-220HL, PLACCEL CD-210T, and PLACCEL CD-221T (manufactured by Daicel Chemical Industries, Ltd.).

Specific examples of the polycaprolactone polyols mentioned above include polycaprolactone diols obtained by conducting an addition reaction between ∈-caprolactone and a diol such as ethylene glycol, polyethylene glycol, propylene glycol, polypropylene glycol, tetramethylene glycol, polytetramethylene glycol, 1,2-polybuthylene glycol, 1,6-hexane diol, neopenthyl glycol, 1,4-cyclohexane dimethanol, and 1,4-butane diol. Specific examples of the marketed products thereof include PLACCEL 205, PLACCEL 205AL, PLACCEL 212, PLACCEL 212AL, PLACCEL 220, and PLACCEL 220AL (manufactured by Daicel Chemical Industries, Ltd.).

Specific examples of the aliphatic hydrocarbon having at least two hydroxyl groups include ethylene glycol, propylene glycol, tetramethylene glycol, 1,4-butane diol, 1,5-pentane diol, 1,6-hexane diol, 1,7-heptane diol, 1,8-octane diol, 1,9-nonane diol, neopenthyl glycol, 2,2-diethyl-1,3-propane diol, 3-methyl-1,5-pentane diol, 2-methyl-1,8-octane diol, polybutadiene hydrogenated at hydroxyl group at its end, glycerin, trimethylol propane, pentaerythritol, and sorbitol.

Specific examples of the alicyclic hydrocarbon having at least two hydroxyl groups include 1,4-cyclohexane diol, 1,4-cyclohexane dimethanol, 1,2-bis(hydroxyethyl)cyclohexane, dimethyl compounds of dicyclopentadiene or dicyclopentadiene, and tricyclodecane dimethanol.

Specific examples of the unsaturated hydro carbon having at least two hydroxyl groups include polybutadienes having hydroxyl group at its end and polyisoplene having hydroxyl group at its end.

Furthermore, specific examples of polyols other than the polyols mentioned above include β-methyl-δ-valerolactone diol, ricinus modified diols, polydimethyl siloxane having diol at its end, polydimethyl siloxane and carbitol modified diols.

The average molecular weight of these polyol compounds is preferably from 50 to 15,000 and more preferably from 100 to 8,000.

Preferred specific examples of the polyisocyanate compounds include diisocyanate compounds such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenyl methane diisocyanate, 4,4'-diphenyl methane diisocyanate, 3,3'-dimethylphenylene diisocyanate, 4,4'-biphenylene diisocyanate, 1,6-hexane diisocyanate, isophorone diisocyanate, 2,2,4-trimethylhexamethylene diisocyanate, bis(2-isocyanate ethyl)fumarate, 6-isopropyl-1,3-phenyl diisocyanate, 4-diphenyl propane diisocyanate, lysine diisocyanate, hydrogenated diphenyl methane diisocyanate, hydrogenated xylylene diisocyanate, and tetramethyl xylylene diisocyanate. Among these, especially, 2,4-tolylene diisocyanate, 2,6-tolylene diisocyanate, hydrogenated xylylene diisocyanate, isophorone diisocyanate and hydrogenated diphenyl methane diisocyanate are preferred. These diisocyantes can be used alone or in combination.

The (meth)acrylate containing a hydroxyl group is (meth)acrylate containing a hydroxyl group in an ester residual group such as 2-hydroxyethyl(meth)acrylate, 2-hydroxypropyl(meth)acrylate, 4-hydroxybutyl(meth)acrylate, 2-hydroxy-3-phenyloxypropyl(meth)acrylate, 1,4-butane diol mono(meth)acrylate, 2-hydroxyalkyl(meth)acryloyl phosphate, 4-hydroxy cyclohexyl(meth)acrylate, 1,6-hexanediol mono(meth)acrylate, neopenthyl glycol mono(meth)acrylate, trimethylol propane di(meth)acrylate, trimethylol ethane di(meth)acrylate, pentaerythritol tri(meth)acrylate, dipentaerythritol penta(meth)acrylate, and (meth)acrylate represented by Chemical structure 2:

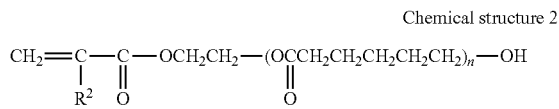

Chemical structure 2

In Chemical structure 2, $R_2$ represents hydrogen atom or methyl group, n is an integer among 1 to 15 and preferably 1 to 4. Furthermore, compounds obtained by addition reaction between a compound containing a glycidyl group such as alkyl glycidyl ether, aryl glycidyl ether or glycidyl(meth)acrylate and (meth)acrylic acid can be also used. Among these, hydroxyalkyl(meth)acrylate such as 2-hydroxyethyl(meth)acrylate, 2-hydroxypropyl(meth)acrylate, and 4-hydroxybutyl(meth)acrylate are preferred.

There is no specific limit to the synthesis method of urethane(meth)acrylate suitable for the optical curing resin for use in the present invention. For example, the following synthesis methods (i) to (iii) can be used.

(i) A method in which a polyisocyanate and a (meth)acrylate containing hydroxyl group are reacted first and then a polyol is added for further reaction;

(ii) A method in which a polyol, a polyisocyanate and a (meth)acrylate containing hydroxyl group are placed at the same time to conduct a reaction at one time; and (iii) A method in which a polyol and a polyisocyanate are reacted first and then a (meth)acrylate containing hydroxyl group is added for further reaction.

In synthesis of urethane(meth)acrylate, it is preferred to use a urethanization catalyst such as copper naphthenate, cobalt naphthenate, zinc naphthenate, di-n-butyl tin dilaurylate, triethylene amine, 1,4-diazabicyclo[2,2,2]octane or 1,4-diaza-2-methylbicyclo[2,2,2]octane in an amount of 0.01 to 1 parts by weight based on 100 parts by weight of the total amount of the reactant. The reaction temperature in this reaction is from 0 to 90° C. and preferably from 10 to 80° C.

The number average molecular weight of this urethane (meth)acrylate is preferably from 400 to 40,000 and particularly preferably from 600 to 20,000.

Among the radical polymerizable oligomers suitable for the optical curing resin for use in the present invention, a compound obtained by reacting a glycidyl ether type epoxy compound and (meth)acrylic acid is used as epoxy(meth)acrylate.

Specific examples of the glycidyl ether type epoxy compound include a diglycidyl ether of bisphenol A or an adduct thereof with alkylene oxide, a diglycidyl ether of bisphenol F or an adduct thereof with alkylene oxide, a diglycidyl ether of hydrogenated bisphenol A or an adduct thereof with alkylene oxide, a diglycidyl ether of hydrogenated bisphenol F or an adduct thereof with alkylene oxide, ethylene glycol diglycidyl ether, propylene glycol diglycidyl ether, neopenthyl glycol diglycidyl ether, butane diol diglycidyl ether, hexane diol diglycidyl ether, cyclohexane dimethanol diglycidyl ether and polypropylene glycol diglycidyl ether.

The epoxy(meth) acrylate suitable for the optical curing resin for use in the present invention can be obtained by reacting, for example, the glycidyl ether type epoxy compound mentioned above with a (meth) acrylic acid in an amount of 0.9 to 1.5 mol and more preferably 0.95 to 1.1 mol based on 1 equivalent amount of the epoxy group. The reaction temperature is preferably from 80 to 120° C. and the reaction time is from about 10 to about 35 hours.

To accelerate the reaction, it is preferred to use a catalyst such as triphenyl phosphine, TAP[2,4,6-tris(dimethylaminomethyl)phenol], triethanol amine or tetraethyle ammonium chloride. In addition, to prevent the polymerization during the reaction, it is possible to use a polymerization inhibitor (for example, paramethoxy phenol and methyl hydroquinone).

The molecular weight of the epoxy(meth) acrylate is preferably from 400 to 10,000.

Furthermore, the epoxy(meth) acrylates can be used alone or in combination. When the epoxy(meth)acrylate is contained in an ultraviolet curing resin composition, the content thereof is from 1 to 30% by weight and preferably from 5 to 20% by weight.

Specific examples of the epoxy(meth)acrylate suitable for the optical curing resin for use in the present invention include bisphenol A type epoxy(meth)acrylate and phenolnovolac type epoxy(meth)acrylate. Specific examples of the bisphenol type epoxy resins for use therein include bisphenol A type epoxy resins such as EPICOAT 828, EPICOAT 1001 and EPICOAT 1004 (manufactured by Yuka-Shell epoxy Co., Ltd.) and bisphenol F type epoxy resins such as EPICOAT 4001P, EPICOAT 4002P and EPICOAT 4003P (manufactured by Yuka-Shell epoxy Co., Ltd.)

Among the radical polymerizable oligomers suitable for the optical curing resin for use in the present invention, for example, a compound obtained by reaction between a (meth)acrylic acid and a polyester polyol obtained by reaction between a polyol and a polybasic acid can be used as polyester(meth)acrylate. Specific examples of the polyol include neopentyl glycol, ethylene glycol, propylene glycol, 1,6-hexane diol, and trimethylol propane. Specific examples of the polybasic acid include succinic acid, phthalic acid, hexahydrophthalic anhydride, adipic acid, azelaic acid, and tetrahydrophthalic anhydride.

A specific example of the reactive dilute agent formed of a (meth)acrylate monomer suitable for the optical curing resin for use in the present invention includes a (meth)acrylate compound having at least one (meth)acryloyl group in one molecule. A single functional compound having only one (meth)acryloyl group or a multi-functional compound having at least two (meth)acryloyl groups can be used. Both compounds can be used in combination with a suitable ratio.

Specific examples of the single functional compound having only one (meth)acryloyl group include hydroxyl alkyl (meth)acrylates such as 2-hydroxyethyl(meth)acrylate, 2-hydroxypropyl(meth)acrylate, and 4-hydroxybutyl(meth)acrylate. These are preferably used for an optical disc in terms of improvement in heat resistance and moisture resistance. In addition, as other single functional compounds having only one (meth)acryloyl group, methyl(meth)acrylate, ethyl(meth)acrylate, propyl(meth)acrylate, isopropyl(meth)acrylate, butyl(meth)acrylate, amyl(meth)acrylate, isobutyl(meth)acrylate, t-butyl(meth)acrylate, pentyl(meth)acrylate, isoamyl(meth)acrylate, hexyl(meth)acrylate, heptyl(meth) acrylate, octyl(meth)acrylate, isooctyl(meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, octadecyl(meth)acrylate, stearyl(meth)acrylate, tetrahydrofurfuryl(meth)acrylate, butoxyethyl(meth)acrylate, ethoxydiethylene glycol(meth)acrylate, benzil(meth)acrylate, cyclohexyl(meth)acrylate, phenoxyethyl(meth)acrylate, polyethylene glycol mono(meth)acrylate, polypropylene glycol mono(meth)acrylate, methoxyethylene glycol mono(meth)acrylate, ethoxyethylene glycol mono(meth)acrylate, ethoxyethoxyethyl(meth)acrylate, methoxypolyethylene glycol (meth)acrylate, methoxypolypropylene glycol(meth) acrylate, dicyclopentadienyl(meth)acrylate, dicyclopentanyl (meth)acrylate, dicyclopentenyl(meth)acrylate, tricyclodecanyl(meth)acrylate, bornyl(meth)acrylate, isobornyl(meth)acrylate, adamantly(meth)acrylate, dimethylaminoethyl(meth) acrylate, diethylaminoethyl(meth)acrylate, 7-amino-3,7-dimethyloctyl(meth)acrylate, (meth)acryloyl morpholine, 2-(meth)aclyloyloxy ethylphthalate, 2-(meth)acryloyloxyethyl hexahydrophthalate, 2-(meth) acryloyloxy propylphthalate, 2-(meth)acryloyloxypropyl tetrahydrophthalate, 2-(meth)acryloyloxy propyl hexahydrophthalate, 2-(meth)acryloyloxy ethylsuccinate, trifluoroethyl (meth)acrylate, tetrafluoropropyl(meth)acrylate, hexafluoropropyl(meth)acrylate, octafluoropentyl(meth) acrylate, heptafluoropropyl(meth)acrylate, octafluoropentyl (meth)acrylate, heptadecafluorodecyl(meth)acrylate, mono [2-(meth)acryloyloxy ethyl]phosphate, mono[2-(meth) acryloyloxy ethyl]diphenyl phosphate and mono[2-(meth) acryloyloxy propyl]phosphate.

Specific examples of the market products thereof include ARONIX M101, ARONIX M102, ARONIX M110, ARONIX M111, ARONIX M113, ARONIX M114, ARONIX M117, ARONIX M120, ARONIX M152, ARONIX M154, ARONIX M5300, ARONIXM5400, ARONIXM5500, and ARONIXM5600 (manufactured by Toagosei Co., Ltd.); KAYARADTC-110S, KAYARADR-128H, KAYARADR629, and KAYARAD R644 (manufactured by Nippon Kayaku Co., Ltd.); IPAA, AIB, SBAA, TBA, IAAA, HEXA, CHA, NOAA, IOAA, INAA, LA, TDA, MSAA, CAA, HDAA, LTA, STA, ISAA-1, ODAA, NDAA, IBXA, ADAA, TCDA, 2-MTA, DMA, BISCOAT #150, BISCOAT #150D, BISCOAT #155, BISCOAT #158, BISCOAT #160, BISCOAT #190, BISCOAT #190D, BISCOAT #192, BISCOAT #193, BISCOAT #220, BISCOAT #320, BISCOAT #2311HP, BISCOAT#2000, BISCOAT#2100, BISCOAT#2150, BISCOAT#150, and BISCOAT #2180, and MTG (manufactured by Osaka Organic Chemical Industry Ltd.); NK ester M-20G, NK ester M-40G, NK ester M-90G, NK ester M-230G, NK ester CB-1, NK ester SA, NK ester S, NK ester AMP-10G, NK ester AMP-20G, NK ester AMP-60G, NK ester AMP-90G, NK ester A-SA and NK ester NLA (manufactured by Shin-Nakamura Chemical Co., Ltd.); ACMO (manufactured by Kohjin Co., Ltd.); LIGHT-ACRYLATE IA-A, LIGHT-ACRYLATE L-A, LIGHT-ACRYLATE S-A, LIGHT-ACRYLATE BO-A, LIGHT-ACRYLATE EC-A, LIGHT-ACRYLATE MTG-A, LIGHT-ACRYLATE DPM-A, LIGHT-ACRYLATE PO-A, LIGHT-ACRYLATE IPO-200A, LIGHT-ACRYLATE THF-A, LIGHT-ACRYLATE IB-XA, LIGHT-ACRYLATE HOA-MS, LIGHT-ACRYLATE HOA-MPL, LIGHT-ACRYLATE HOA-MPE, LIGHT-ACRYLATE HOA-HH, LIGHT-ACRYLATE IO-A, LIGHT-ACRYLATE BZ-A, LIGHT-ACRYLATE NP-EA, LIGHT-ACRYLATE NP-10EA LIGHT-ACRYLATE HOB-A, LIGHT-ACRYLATE FA-108, epoxy ester M-600A, and LIGHT-ESTER P-M (manufactured by Kyoeisha Co., Ltd.); FA-511, FA-512A and FA-513A (manufactured by Hitachi Chemical Co., Ltd.); AR-100, MR-100, MR-200 and MR-260 (manufactured by Daihachi Chemical Industry Co., Ltd.); and JAMP-100, JAPM-514 and JPA-514 (manufactured by Johoku Chemical Co., Ltd.).

Specific examples of the multi-functional compound having at least two (meth)acryloyl groups mentioned above include multi-functional (meth)acrylates such as ethylene glycol di(meth)acrylate, propylene glycol di(meth)acrylate, 1,4-butane diol di(meth)acrylate, 1,6-hexane diol di(meth) acrylate, 1,9-nonane diol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, neopentyl glycol di(meth)acrylate, hydroxyl pivalic acid neopentyl glycol di(meth)acrylate, trimethylol propane tri(meth)acrylate, pentaerythritol tri(meth) acrylate, pentaerythritol tetra(meth)acrylate, ditrimethylol propane tetra(meth)acrylate, dipentaerythritol penta(meth) acrylate, dipentaerythritol propane trioxypropyl(meth)acrylate, trimethylol propane polyoxyethyl(meth)acrylate, tris(2-hydroxyethyl)isocyanulate di(meth)acrylate, tris(2-hydroxyethyl)isocyanulate tri(meth)acrylate, an adduct of bisphenol A di(meth)acrylate with ethylene oxide, an adduct of bisphenol F di(meth)acrylate with ethylene oxide, an adduct of bisphenol A di(meth)acrylate with propylene oxide, an adduct of bisphenol F di(meth)acrylate with propylene oxide, tricyclodecane dimethanol di(meth)acrylate, bisphenol A diepoxy di(meth)acrylate, bisphenol F diepoxy di(meth)acrylate, bis[2-(meth)acryloyloxyethyl]phosphate, bis[2-(meth)acryloyloxy propyl]phosphate, and tris[2-(meth)acryloyloxy ethyl]phosphate.

Specific examples of the market products thereof include SA-1002, SA-2006, SA-2007, SA-4100, SA-5100, SA-6000, SA-7600, SA-8000 and SA-9000 (manufactured by Mitsubishi Chemical Corporation); BISCOAT #195, BISCOAT #195D, BISCOAT #214HP, BISCOAT #215, BISCOAT #215D, BISCOAT #230, BISCOAT #230D, BISCOAT #260, BISCOAT #295, BISCOAT #295D, BISCOAT #300, BISCOAT #310HP, BISCOAT #310HG, BISCOAT #312, BISCOAT #335HP, BISCOAT #335D, BISCOAT #360, BISCOAT #GPT, BISCOAT #400, BISCOAT V#540, and BISCOAT #700 (manufactured by Osaka Organic Chemical Industry Ltd.); KAYARADMANDA, R-256, NPGDA, PEG400DA, R-167, HX-220, HX-620, R-551, R-712, R-604, R-684, GPO-303, TMPTA, THE-330, TPA-320, TPA-330mPET-30, RP-1040, T-1420, DPHA, D-310, D-330, DPCA-20, DPCA-30, DPCA-60 and DPCA-120 (manufactured by Nippon Kayaku Co., Ltd.); ARONIX M210, ARONIXM208, ARONIXM215, ARONIXM220, ARONIXM225, ARONIXM233, ARONIX M240, ARONIX M245, ARONIX M260, ARONIX M270, ARONIX M305, ARONIX M309, ARONIXM310, ARONIXM315, ARONIXM320, ARONIXM350, ARONIXM360, ARONIX M400, ARONIX M408 and ARONIX M450 (manufactured by Toagosei Co., Ltd.); SR-212, SR-213 and SR-355 manufactured by Sartomer Company Inc.); SP-1506, SP-1507, SP-1509, SP-1519-1, SP-1563, SP-2500, VR-60, VR-77 and VR-90 (Showa High Polymer Co., Ltd.); LIGHT-ESTER P-2M (manufactured by Kyoeisha Co., Ltd.); BISCOAT 3PA (manufactured by Osaka Organic Chemical Industry Ltd.); and EB-169, EB-179, EB-3603 and R-DX-63182 (manufactured by Daicel UCB Co., Ltd.)

Among the reactive dilute agents, it is particularly preferred to use the hydroxyalkyl(meth)acrylate and multifunctional (meth)acrylate in combination.

As the composition of the optical curing resin for use in the present invention, it is preferred to use a radical polymerizable oligomer in an amount of from 30 to 70% by weight, a reactive dilute agent in an amount of from 30 to 70% by weight and a photopolymerization initiator in an amount of from 1 to 8% by weight. In addition, an additive (for example, antioxidant and polymerization inhibitor) can be contained in an amount of about 1 to about 9% by weight.

A specific example of the photopolymerization initiators for use in the present invention includes a photopolymerization initiator formed of 1-hydroxy-cyclohexyl-phenyl-keton and/or 2-hydroxy-1-{4-[4-(2-hydroxy-2-methyl-propyonyl)-benzil]phenyl-2-methyl-propane-1-one, and 2-methyl-1-[4-(methylthio)phenyl]-2-morpholinopropane-1-one.

Also, 2-hydroxy-2-methyl-1-phenyl-propane-1-one, 2,2-dimethoxy-1,2-diphenylethane-1-one, 1-[4-(2-hydroxyethoxy)-phenyl]-2-hydroxy-2-methyl-1-propane-1-one, 2-methyl-[4-(methylthio)phenyl]-2-morpholino-1-propanone, 2-chlorothioxanthone, 2,4-dimethylthioxanthone, 2,4-diisopropylthioxanthone and isopropylthioxanthone can be blended therewith.

In addition, to improve the inner hardness of the cured material, a photopolymerization initiator having a sensitivity in the range of wavelength of not less than 400 nm can be also contained. Specific examples of such photopolymerization initiators include phenylglyoxylic acid methyl ester (absorbance index at 405 nm=24 ml/g·cm), bis(2,4,6-trimethylbenzoyl)phenylphosphine oxide (absorbance index at 405 nm=900 ml/g·cm), 2-benzil-2-dimethylamino-1-(4-morpholinophenyl)butanone-1 (absorbance index at 405 nm=280 ml/g·cm), 2-dimethylamino-2-(4-methyl-benzil)-1-(4-morpholine-4-yl-phenyl)b utane-1-one (absorbance index at 405 nm=280 ml/g·cm), and 2,4,6-trimethylbenzoyl-diphenylphosphine oxide (absorbance index at 405 nm=165 ml/g·cm).

To form the cover layer 601, there can be used a known method in which an ultraviolet curing resin is spin-coated while the center hole is masked, and a method of the present inventors in which while a substrate is heated to control the viscosity thereof in the radius direction of the substrate, a resin is spin-coated thereon.

Figure 7:
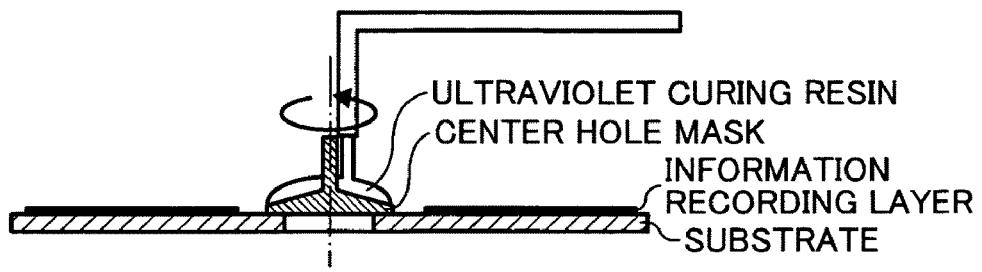
FIG. 7 is a diagram illustrating a method of forming a cover layer: (a) represents processes of masking the center hole of a medium, supplying an ultraviolet curing resin around the center and extending the resin by rotating the substrate; (b) represents a process of concentrating halogen lamp light to the external circumference using a concentration optical system to planarize the resin pool; and (c) represents a process of removing the mask to cure the resin layer by irradiation of ultraviolet.
Figure 7:
Figure 7:
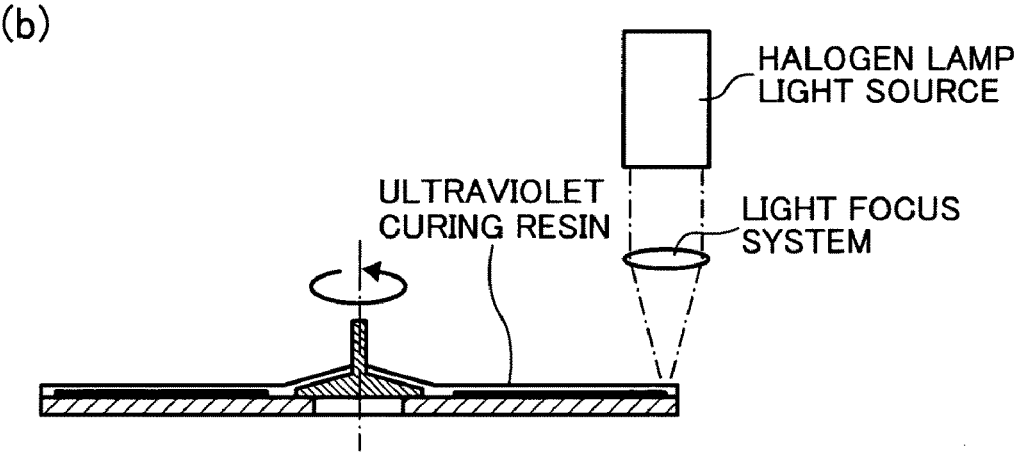
Figure 7:
Figure 7:
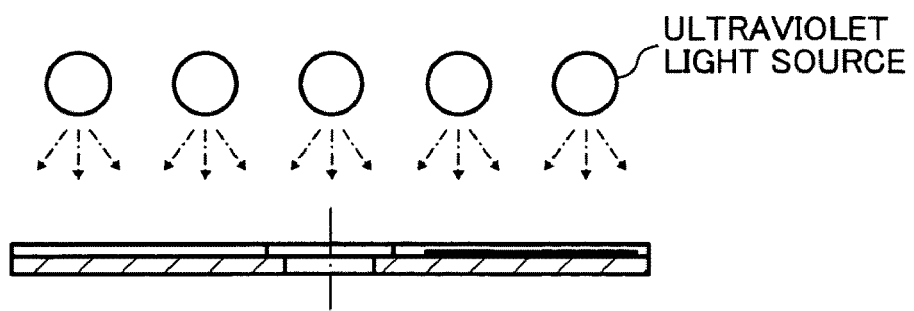

A method of forming the cover layer 601 is described with reference to FIG. 7.

As illustrated in FIG. 7(a), the center hole of a medium is masked by a center hole mask having a diameter of 19 mm and an ultraviolet curing resin is supplied around the center of the mask. Next, to extend the resin on the substrate, the substrate is rotated at 800 to 1,500 rpm according to the viscosity of the resin. At this point, a halogen lamp is concentrated to the outer circumference of the medium by using a light focus system as illustrated in FIG. (7b) to partially heat the medium so that the resin pool can be planarized. Next, the center hole mask is removed and the resin layer is cured by ultraviolet from the ultraviolet light source as illustrated in FIG. 7(c). Thus, the optical information recording medium as illustrated in FIG. 6 is obtained.

The irradiation amount of the energy beam is preferably from 50 to 2,000 mJ/cm$^2$ and particularly preferably from 200 to 1,500 mJ/cm$^2$. Any lamp that can emit energy beam for use in curing can be used. Specific examples thereof include a low pressure, a high pressure or a super high pressure mercury lamp, a metalhalide lamp, a (pulse) xenon lamp and an electrodeless discharge lamp. The wavelength of the energy beam for use in curing an ultraviolet curing resin composition is from 150 to 450 nm.

Furthermore, though not shown in FIG. 6, it is possible to form a hard coat layer (an ultraviolet curing resin layer, an optical curing resin layer in which an inorganic material is dispersed, or an inorganic material layer) on the cover layer (on the incident side of light) by a similar spin coat method to improve the anti-abrasion or damage property or the anti-fouling property of the surface layer. In this case, with regard to Blu-ray disc format, the layer thickness of the optical transparent layer including the cover layer and the hard coat layer is from 98 to 102 μm when the refraction index n is 1.6.

A phase change type optical information recording medium having a single information recording layer is described as a structure embodiment of the phase change type optical information recording medium of the present invention. A multi-layer optical information recording medium having multiple information recording layers via (an) intermediate layers can be also formed.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Examples 1 to 5 and Comparative Examples 1 and 2

On a polycarbonate substrate (ST3000, manufactured by Teijin Bayer Polytech Co., Ltd.) having a guide groove having a depth of 20 nm and a track pitch of 0.32 μm, a thickness of 1.1 mm and a diameter of 120 mm, the following layers are formed sequentially by a sputtering method using the targets having the following compositions to obtain an information recording layer.
(1) Reflective layer: Al with 1.0% by weight Ti (layer thickness: 35 nm)
(2) First dielectric layer: $Si_3N_4$ (layer thickness: 16 nm)
(3) Phase change recording layer: $Bi_2O_3$ with 35 mol % $B_2O_3$ (layer thickness: 10 nm)
(4) Second dielectric layer: ZnS with 20 mol % $SiO_2$ (layer thickness 10 nm)

Next, an ultraviolet curing resin layer is formed on the information recording layer by a spin coat method using an ultraviolet curing resin shown in Table 1. The ultraviolet curing resin layer is cured by irradiation of ultraviolet with a UV lamp (HP-6, manufactured by Fusion UV Systems Japan KK.) at 400 mW/cm$^2$ for 3.5 seconds in a nitrogen atmosphere. Thus, a write once type optical information recording medium (i.e., write once optical information recording medium corresponding to Blu-ray disc format) having a cover layer having a thickness of about 0.1 mm is manufactured.

The ultraviolet curing resins for use in Examples and Comparative Examples in Table 1 are reactants obtained by adding three kinds of monomers {a hydroxyethyl methacrylate (HEMA, manufactured by Toagosei Co., Ltd.), a hydropivalic acid neopenthyl glycol diacrylate (MANDA, manufactured by Nippon Kayaku Co., Ltd.) and a trimethylol propane triacrylate (TMPTA, manufactured by Toagosei Co., Ltd.) in an amount according to the ratio shown in Table 1 to a bisphenol A glycidyl ether acrylate (EPA, manufactured by Nippon Kayaku Co., Ltd.) in an amount of 15% by weight and a polyester based urethane acrylate (UX-4101, manufactured by Nippon Kayaku Co., Ltd.) in an amount of 30% by weight, with 1-hydroxy-cyclohexyl-phenyketone (IRGACURE 184, manufactured by Chibaspecialty Chemicals KK.) and 2-benzil-2-dimethylamino-1-(4-morpholinophenyl)-butanone-1 (IRGACURE 369, manufactured by Chibaspecialty Chemicals KK.) as photopolymerization initiators in the total amount of 5% by weight. The compositions of the monomer having a high curability and the photopolymerization initiator are adjusted such that the inner hardness Hi of the cover layer increases in the sequence of Comparative Example 1, Examples 1 to 5 and Comparative Example 2 in Table 1.

To each write once type optical information recording medium mentioned above, recording is performed under the recording condition of 1× based on write-once type Blu-ray disc format (BD-R Version 1.1). The values of archival jitters and shelf jitters after the reliance test at 80° C. and 85% RH for 300 hours are evaluated by an optical disc evaluation device (ODU-1000, manufactured by Pulstec Industrial Co., Ltd.) for a wavelength of 405 nm with an NA of 0.85. The medium that satisfies the regulation value (i.e., not greater than 6.5%) is evaluated as good and the medium having archival jitters and shelf jitters greater than 6.5% is evaluated as bad.

As seen in Table 1, both archival jitters and shelf jitters are not greater than 6.5% for the media of Examples 1 to 5 having an inner hardness Hi of from 3.8 to 5.5. Those media thereof are reliable.

To the contrary, since the inner hardness Hi of the medium of Comparative Example 1 is less than 3.8, the shelf jitters are not problematic but the archival jitters deteriorate to 7.2%.

With regard to the medium of Comparative Example 1, since the inner hardness Hi of the medium thereof is greater than 5.5, the archival jitters are not problematic but the shelf jitters deteriorate to 7.8%.

As described above, it is found that when the inner hardness Hi of a medium is from 3.8 to 5.5, the medium that meets the format for both archival jitter value and shelf jitter value and is reliable is obtained.

TABLE 1

| Composition | Examples | | | | | Comparative Examples | |
|---|---|---|---|---|---|---|---|
| | 1 | 2 | 3 | 4 | 5 | 1 | 2 |
| EPA | 15 | 15 | 15 | 15 | 15 | 15 | 15 |
| UX-4101 | 30 | 30 | 30 | 30 | 30 | 30 | 30 |
| HEMA | 30 | 30 | 25 | 25 | 25 | 35 | 20 |
| MANDA | 15 | 12 | 20 | 17 | 15 | 15 | 17 |
| TMPTA | 5 | 8 | 5 | 8 | 10 | | 13 |
| IRGACURE 184 | 5 | 5 | 5 | 4.5 | 4.5 | 5. | 4.5 |
| IRGACURE 369 | | | | 0.5 | 0.5 | | 0.5 |
| Inner hardness Hi | 3.8 | 4.1 | 4.9 | 5.2 | 5.5 | 3.7 | 5.6 |
| Archival jitter | 6.5 | 6.2 | 5.9 | 5.9 | 5.8 | 7.2 | 5.7 |
| Shelf jitter | 6.0 | 5.9 | 6.1 | 6.0 | 6.5 | 6.0 | 7.8 |
| Evaluation | Good | Good | Good | Good | Good | Bad | Bad |

EPA: bisphenol A glycidyl ether acrylate (manufactured by Nippon Kayaku Co., Ltd.)
UX-4101: polyester based urethane acrylate (manufactured by Nippon Kayaku Co., Ltd.)
HEMA: hydroxyethyl methacrylate (manufactured by Toagosei Co., Ltd.)
MANDA: hydropivalic acid neopenthyl glycol diacrylate (manufactured by Nippon Kayaku Co., Ltd.)
TMPTA: trimethylol propane triacrylate (manufactured by Toagosei Co., Ltd.)
IRGACURE 184: 1-hydroxy-cyclohexyl-phenyketone (manufactured by Chibaspecialty Chemicals KK.)
IRGACURE 369: 2-benzil-2-dimethylamino-1-(4-morpholinophenyl)-butanone-1 (manufactured by Chibaspecialty Chemicals KK.)

Examples 6 to 8 and Comparative Examples 3 and 4

On the substrate used in Example 1, multiple layers are sequentially formed by a sputtering method using the target having the following compositions to obtain an information recording layer.
(1) Reflective layer: Ag with 0.5% by weight Bi (layer thickness: 60 nm)
(2) First dielectric layer: $Si_3N_4$ (layer thickness: 4 nm)
(3) Phase change recording layer: $Bi_2O_3$ with 25 mol % $B_2O_3$ and 5 mol % $GeO_2$ (layer thickness: 14 nm)
(4) Second dielectric layer: ZnS with 20 mol % $SiO_2$ (layer thickness 55 nm)

Next, an ultraviolet curing resin layer is formed on the information recording layer by a spin coat method using an ultraviolet curing resin shown in Table 2. The ultraviolet curing resin layer is cured by irradiation of ultraviolet with a UV lamp (HP-6, manufactured by Fusion UV Systems Japan KK.) at 400 mW/cm² for 3.5 seconds in a nitrogen atmosphere. Thus, a write once type optical information recording medium (i.e., write once optical information recording medium corresponding to Blu-ray disc format) having a cover layer having a thickness of about 0.1 mm is manufactured.

To each write once type optical information recording medium mentioned above, recording is performed under the recording condition of 4× based on write-once type Blu-ray disc format (BD-R Version 1.2). The values of archival jitters and shelf jitters after the reliance test at 80° C. and 85% RH for 300 hours are evaluated by an optical disc evaluation device (ODU-1000, manufactured by Pulstec Industrial Co., Ltd.) for a wavelength of 405 nm with NA of 0.85. As in the case for Table 1, the medium that satisfies the regulation value not greater than 6.5% is evaluated as good and the medium having archival jitters and shelf jitters greater than 6.5% is evaluated as bad.

As seen in Table 2, both archival jitters and shelf jitters are not greater than 6.5% for the media of Examples 6 to 8 having an inner hardness Hi of from 3.8 to 5.5. Those media thereof are reliable.

To the contrary, since the inner hardness Hi of the medium of Comparative Example 3 is less than 3.8, the shelf jitters are not problematic but the archival jitters deteriorates to 7.0%.

With regard to the medium of Comparative Example 4, since the inner hardness Hi of the medium thereof is greater than 5.5, the archival jitters are not problematic but the shelf jitters deteriorate to 8.0%.

When the recording is performed under the recording condition of 4× for the media of Examples 1 to 5, the optimal recording power is 10.2 mW and the jitter is from 6.2 to 6.4%. Namely, the recording power range (power margin) satisfying that the jitter is not greater than 6.5% is extremely narrow.

By contrast, in the cases of media of Examples 6 to 8, the optimal recording power is 8.0 mW and the jitter is from 5.3 to 5.5%. These media are highly sensitive and the power margin is wide at high speed recording. It is thus found that, by using Bi, B, O and Ge as the main compositions of the recording materials, a medium having a good sensitivity and a good power margin at a high speed recording can be obtained.

Next, with regard to the media of Examples 6 to 8 and Comparative Examples 1 and 4, the surface deficiency is checked by a near dark field method of ISM Blue+ inspection system manufactured by Dr. Schenk Japan Co., Ltd.

As illustrated in FIG. 8, the result is that at least several tens of surface deficient portions are detected in the media of Examples 6 and Comparative Examples 3 and 4. This deficiency does not cause a problem when the recording linear velocity is slow. However, when the residual error is measured by an optical disc evaluation device ODU-1000 while trespassing these deficient portions at 4× with tracking, the residual focus error less than 3.2 kHz is from 75 to 135 nm, which does not satisfy the format (less than 80 nm). In contrast, deficient portions having a size of FIG. 8 are not detected in the media of Examples 7 and 8, which contain 2-methyl-1-[4-(methylthio)phenyl]-2-morphpolinopropane-1-one as a photopolymerization initiator in an amount of 0.05%. Deficient portions illustrated in FIG. 9 are observed on rare occasions by a microscope. When the residual focus error is similarly measured therefor with tracking on the deficient portions, the residual focus error less than 3.2 kHz is not greater than 65 nm, meaning that the format (less than 80 nm) is satisfied.

As described above, by containing 2-methyl-1-[4-(methylthio)phenyl]-2-morphpolinopropane-1-one having a high surface curing property as a photopolymerization initiator, it is possible to obtain a medium for which the deficiency of the surface of the cover layer can be reduced and which has an excellent survo characteristic with a small residual error.

TABLE 2

| Composition | Examples | | | Comparative Examples | |
| --- | --- | --- | --- | --- | --- |
| | 6 | 7 | 8 | 3 | 4 |
| EPA | 15 | 15 | 15 | 15 | 15 |
| UX-4101 | 30 | 30 | 30 | 30 | 30 |
| HEMA | 25 | 25 | 25 | 35 | 20 |
| MANDA | 20 | 20 | 15 | 15 | 15 |
| TMPTA | 5 | 5 | 10 | | 15 |
| IRGACURE 127 | 5 | 5 | 5 | 5 | 5 |
| IRGACURE 907 | | 0.05 | 0.05 | | |
| Inner hardness Hi | 4.8 | 4.8 | 5.4 | 3.7 | 5.7 |
| Archival jitter | 6.0 | 5.8 | 5.7 | 7.0 | 6.0 |
| Shelf jitter | 6.0 | 6.2 | 6.3 | 6.2 | 8.0 |
| Evaluation | Good | Good | Good | Not good | Not good |
| Residual error | Not good | Good | Good | Not good | Not good |

EPA, UX-4101, HEMA, MANDA and TMPTA: Refer to Table 1.
IRGACURE 127: 2-hydroxy-1-{4-[4-(2-hydroxy-2-methylpropyonyl)benzyl]phenyl}-2-methylpropane-1-one (manufactured by Chibaspecialty Chemicals KK.)
IRGACURE 907: 2-methyl-1-[4-(methylthio)phenyl]-2-morpholinopropane-1-one (manufactured by Chibaspecialty Chemicals KK.)

This document claims priority of and contains subject matter related to Japanese Patent Applications Nos. 2006-334875 and 2007-286124, filed on Dec. 12, 2006, and Nov. 2, 2007, respectively, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An optical recording medium comprising:
    a substrate;
    an information recording layer comprising a recording layer; and
    a cover layer having a thickness of from about 75 to about 100 μm;
    wherein information is written and read on the information recording layer by irradiation of laser beam via the cover layer, the cover layer comprises an optical curing resin and an inner hardness Hi defined as hardness H of the cover layer on a side of the information recording layer satisfies the following relationship: $3.8 \leq Hi \leq 5.5$, when $H=3.8584 \times F/(h \times h)$, wherein h represents an indented depth in a state in which a triangular pyramid indenter with a tip angle of 115° is pressed under F=9.8 mN.

2. The optical recording medium according to claim 1, wherein the optical curing resin comprises 2-methyl-1-[4-(methylthio)phenyl]-2-morpholinopropane-1-one as an optical polymerization initiator.

\* \* \* \* \*